United States Patent [19]

Axelson

[11] Patent Number: 4,671,561
[45] Date of Patent: Jun. 9, 1987

[54] LOADING PLATFORM CONSTRUCTION

[75] Inventor: Gunnar Axelson, Södertälje, Sweden

[73] Assignee: AB Sodertalje Snickeri-och Karosserifabrik, Sweden

[21] Appl. No.: 657,225

[22] Filed: Oct. 3, 1984

[30] Foreign Application Priority Data

Nov. 10, 1983 [SE] Sweden ............................... 8306198

[51] Int. Cl.⁴ .............................................. B60R 27/00
[52] U.S. Cl. ................................. 296/181; 298/23 R; 298/23 A
[58] Field of Search ...................... 298/13, 23 R, 23 A; 296/57 R, 181, 183, 184; 105/363, 378, 406 A; 5/429, 430; 312/322; 108/56.1

[56] References Cited

U.S. PATENT DOCUMENTS

| 697,949 | 4/1902 | Schofield | 296/183 |
| 2,508,674 | 5/1950 | Jolly | 296/183 |
| 2,669,499 | 2/1954 | Vanderplank | 312/322 |
| 2,974,997 | 3/1961 | Parsley | 296/183 |
| 3,048,857 | 8/1962 | Hutt | 5/429 |
| 3,456,995 | 7/1969 | Nyquist | 312/322 |
| 3,481,643 | 12/1969 | Campbell | 296/204 |

FOREIGN PATENT DOCUMENTS

| 1075079 | 10/1954 | France | 312/322 |
| 1109700 | 1/1956 | France | . |
| 1523442 | 3/1968 | France | . |
| 7407900-5 | 6/1974 | Sweden | . |
| 994174 | 6/1965 | United Kingdom | 296/57 R |

Primary Examiner—Robert B. Reeves
Assistant Examiner—Carol L. Olson
Attorney, Agent, or Firm—Ostrolenk, Faber, Gerb & Soffen

[57] ABSTRACT

The present invention relates to a loading platform construction, primarily intended for light trucks, with a loading platform consisting of a combination of a thin sheet (24) and corrugated sheet (23) arranged on a support frame and equipped with collapsible side flaps (9) which can be fully inserted under the side edges of the loading platform, the side edges entirely lacking support beams outside the support frame.

4 Claims, 4 Drawing Figures

LOADING PLATFORM CONSTRUCTION

The present invention relates to a loading platform construction, primarily intended for light trucks, comprising a flat loading platform, collapsible side flaps, a collapsible rear flap and a support frame carrying the loading platform and fitting the vehicle.

BACKGROUND OF THE INVENTION

Nowadays the sheet comprising the loading plane of a loading platform is made of plywood which includes birch in order to give the requisite hardness, the thickness of the plywood being at least 21 mm to ensure the requisite strength. These loading platforms are arranged on a support frame having support beams extending from the support frame to the edges of the loading platform.

Side flaps are arranged on hinges in conjunction with the transverse support beams. The side flaps are designed to hang vertically during loading and unloading. Some types of flaps are removable but on light trucks they are usually permanently fitted.

The drawbacks encountered with the above-mentioned type of loading platform construction are multiple. Plywood sheets of such thicknesses are heavy, expensive to manufacture and since birch is also in short supply throughout the Nordic countries, it is also difficult to obtain in the desired quantities. This is probably the main reason for light trucks currently being imported with loading platforms.

Furthermore, the side flaps are often damaged during loading and unloading of the truck, since they are directly vulnerable if the truck is involved in an accident. In this case the flaps must generally be replaced immediately since they cannot be locked in upright position once they have become bent and/or distorted. Besides which, the hinge-pivot protrudes from the side of the loading platform and catches in gate-posts and other vehicles, as well as being a potential danger to personnel.

Another drawback of the known flaps is that the join between the upper side of the loading platform and the flap is along the lower side so that when gravel is being loaded or unloaded, for instance, it is extremely difficult to clear the sealing surface from gravel and sand. This means that it is difficult to secure the flap in vertical position, and the flap may become damaged.

BRIEF STATEMENT OF THE INVENTION AND THE OBJECT THEREOF

The main object of the present invention is to effect an entirely new loading platform construction, both with respect to the loading platform itself, and to the side flaps and their connection to the loading platform, in which the drawbacks listed above are avoided.

Another object of the invention is to achieve a loading platform construction which, can be sent in parts or partly assembled to ports of shipment, for instance, for loading trucks without platforms. Such vehicles can thus be imported without loading platforms.

It has now surprisingly been found that these and other objects and advantages are achieved with a loading platform construction according to the invention, wherein the loading platform is constructed from a flat sheet, forming the upper surface of the loading platform, a corrugated sheet, with the corrugations running in the transverse direction of the platform, the corrugated sheet being joined to said flat sheet and the whole arranged on a support frame comprising two beams spaced from the edges of the loading platform and running in the longitudinal direction of the loading platform. This construction provides such a stable platform, even with a sheet half as thick as conventional loading platform sheets, that side reinforcing beams arranged in transverse direction outside the frame beams can be totally eliminated.

This enables the preferred embodiment of the invention in which the side flaps are collapsible and can be inserted under the parts of the side edges protruding over the frame beams, in guides arranged therefor. At loading and unloading, therefore, particularly when a fork-lift truck is being used, the side flaps can be completely protected from damage without the flap having to be detached from the hinge or the like.

SUMMARY OF THE DRAWINGS

Additional advantages and features of the invention will be revealed in the following detailed description with reference to the accompanying drawings in which.

DETAILED DESCRIPTION OF THE INVENTION

Figure 1:
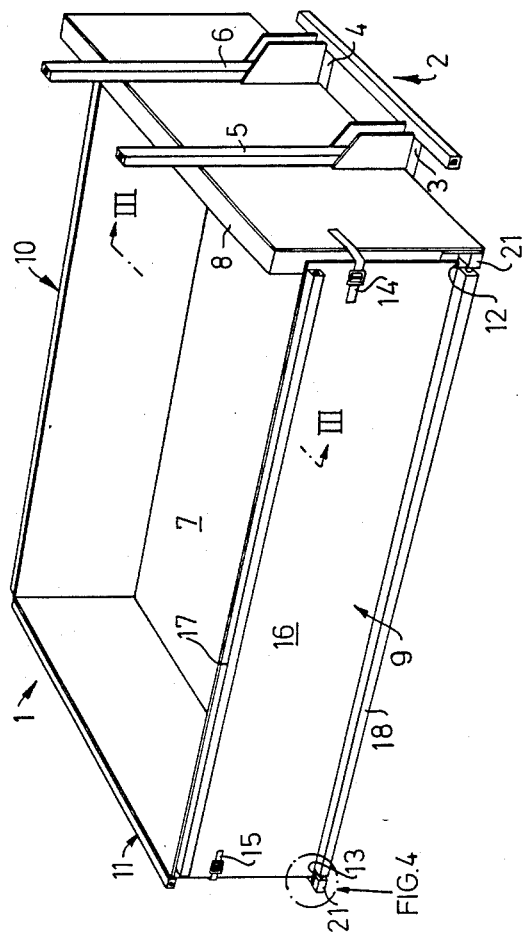
FIG. 1 shows in perspective an embodiment of the loading platform according to the invention.

FIG. 1 thus shows a perspective view of the loading platform construction according to the invention, the platform section being designated 1 and the frame carrying the platform being designated 2.

The frame 2 is designed to fit the vehicle on which the loading platform construction is to be mounted and the details of its design do not affect the invention itself. The frame consists partly of an under-carriage comprising two longitudinal beams 3, 4, supporting the platform itself, and two front, vertical beams 5, 6 designed for mounting on the body of the vehicle.

The loading platform itself, designated 7 in the drawings, is flat and is encompassed by a fixed front flap 8, collapsible side flaps 9, 10 and a collapsible rear flap 11.

The side flaps can be hinged at their lower and rear corners 12, 13 and are retained in vertical position by locking means 14, 15. The side flaps consist of a sheet 16 and upper and lower section beams 17, 18, respectively, extending along substantially the entire length of the flap. The flap can thus be made of a relatively thin sheet, i.e. considerably thinner than previously, since the sheet need only take up impact forces in vertical direction, while the beams take up all bending forces in horizontal direction.

Guide rails 21 are arranged in connection with and below the front edge of the loading platform, spaced from the loading platform itself, and corresponding guides 22 are arranged in connection with the rear edge of the loading platform, into which pivots protruding from the lower front and rear corners of the side flaps are inserted to form hinges about which the flaps can be freely pivoted when the flap locks are opened.

Figure 2:
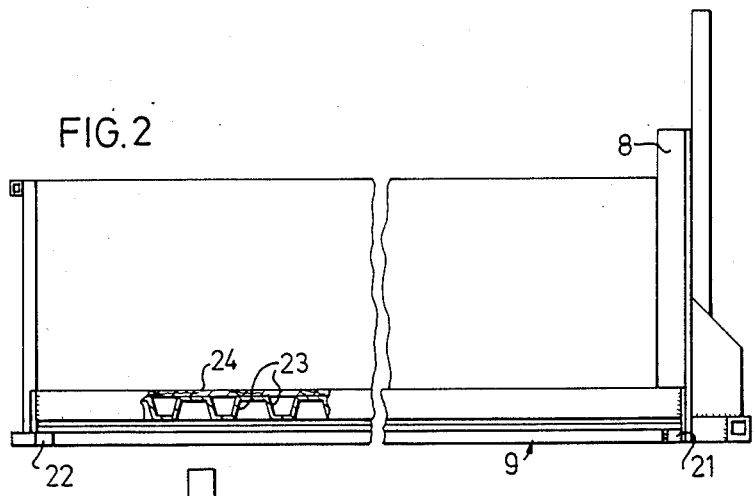
FIG. 2 shows, partially in section, a side view of the platform according to the invention with the side flaps folded down and inserted.

FIG. 2 shows a side view of the loading platform construction according to the invention. A portion of the loading platform is shown in cross-section, showing the unique construction of the loading flap in the form of corrugated sheet 23, in the shown embodiment with trapezoidal corrugations to which a sheet 24, preferably of plywood, is secured by screwing, riveting or the like in the ridges of sheet. This design eliminates the need for reinforcing beams to obtain a sufficiently strong edge along the loading platform outside said frame beams.

This arrangement offers the additional advantage according to the invention that the side flaps can be inserted under the loading platform and kept there during loading and unloading, as well as during transport. The figure shows a side flap 9 inserted under the loading platform. The section beams are somewhat shorter than the sheet forming the side flaps so that, as can be seen in FIG. 2, the sheet 16 is supported by and rests on guide rails 21 and 22, respectively, the pivots guiding insertion of the flap. If the flap is to be removed, it need only be inclined so that the pivots are released from the guide rails and the flap can simply be pulled out and lifted down.

As shown in the drawings, the front, fixed flap 8 has essentially the same thickness as the loading platform. This is because, for reasons of safety, much is demanded of this flap. The same unique construction used in this flap as in the loading platform gives extremely high pressure and impact absorbing capacity at minimum cost and with minimum weight.

Figure 3:
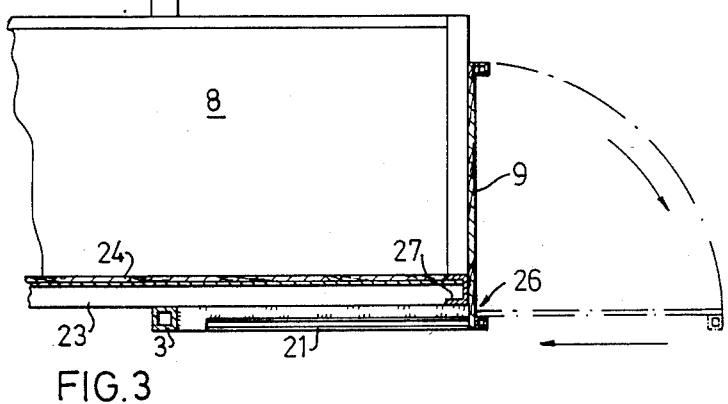
FIG. 3 shows a cross-section taken along the line III—III in FIG. 1, broken lines indicating the flap in extended position

FIG. 3 shows a cross-sectional view through the loading flap towards the front flap 8. From this it can be seen that the guide rail 21 is mounted on a sheet extending below the loading platform 24, 23 to provide a slide-in space for the side flaps. The lack of lateral reinforcing beams thus offers free space for insertion of the side flaps. The length of the rail 21 is such that the guide-hinge pivot in the side flap does not release its grip when the flap is fully inserted under the edge of the loading platform.

According to another embodiment, the guide rail may extend right up to the frame beam 3, or it may extend across the entire width of the loading platform.

FIG. 3, shows the side flap 9 in vertical position, whereas the flapped-down position is indicated by broken lines. As can be seen from the figure, when the flap is down, a space 26 is formed between side flap and edge 27, i.e. the U-iron surrounding the sheet and sheet-metal 24, 23 in the loading platform. This provides automatic clearing and the risk of gravel and the like becoming lodged between the edge of the flap and the edge, and thus making if difficult to lock the flap in vertical position, has been substantially eliminated.

Figure 4:
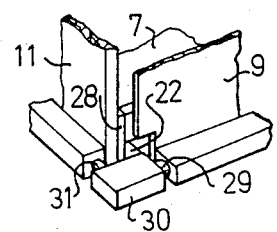
FIG. 4 shows a detail from part of the loading platform according to FIG. 1.

FIG. 4 shows a detail of the rear attachment of the rear flap 11 and side flap 9. Below the loading flap 7, fitted on a sheet 28, in turn connected to the frame beam and the loading platform, is a guide rail 22 for the guide pivot 29 of the side flap 9. A guide 30 is also arranged close to the guide rail, for a hinge pivot 31 for the rear flap. As can be seen in FIG. 4, the pivots are located directly beneath the platform. The pivots are thus shielded from material carried on the platform and adjacent obstructions. Thanks to the lack of reinforcing beams, etc., collapsible supports can be arranged on each side of the frame beam, so that the loading platform can be extended. The guide 30 is preferably arranged so that the rear flap can be raised to the level of the loading platform surface.

Of course the detailed design of the various parts comprising the loading platform constructions according to the invention may be varied within the scope of the invention as it is defined in the following claims.

Thus, section beams may be arranged on all flaps on a level with each other so that they can be joined by flap locks, thus forming an unbroken, encompassing edge line.

The corrugated sheet may also be designed with sinus corrugations. Furthermore, should the standard measurements of the plywood sheets not agree with the size of the platform and the sheet therefore have to be cut, reinforcing strips may be arranged in the corrugated sheet, the joints being reinforced by extra attachments in the edges of the plywood sheets.

According to regulations a certain number of load attachment loops must be provided in each loading platform construction. This is also facilitated by arranging strips or the like in the corrugated sheet.

I claim:

1. A vehicle platform, comprising a flat loading platform, a pair of collapsible side flaps, a collapsible rear flap, a fixed front flap, and support frame means for carrying the loading platform, wherein the loading platform includes a flat sheet and a corrugated sheet placed below the flat sheet, with the corrugations thereof running in the transverse direction of the platform, the corrugated sheet being joined to said flat sheet, and wherein the support frame means comprises two beams spaced from the edges of the loading platform and running in the longitudinal direction of the loading platform, said pair of side flaps arranged for full insertion under the side edges of the loading platform where each side flap further includes a section beam, at the lower edge of the flap, having pivots which engage with external guide rails positioned directly beneath the platform at the front and rear thereof, in which the pivots of the side flaps can be inserted under the loading platform, and where the guide rails have stops.

2. A loading platform construction according to claim 1, wherein pivots (29) are arranged in conjunction with a section beam (18) arranged at the lower edge of the flap, which pivots, together with guide members fitted thereto, arranged in the front and rear edges respectively of the loading platform, spaced below the loading platform, form hinges for the side flaps.

3. A loading platform construction according to claim 2, wherein the guide members consist of guide rails (21, 22) provided externally with stops, in which the pivots (29) of the side flaps can be inserted under the loading platform.

4. A vehicle platform according to, claim 1, wherein the section beams terminate at a distance from the end edges of the side flap, forming support surface means for suspending the side flaps on the guide rails when the side flaps are inserted under the loading platform.

* * * * *